No. 618,456. Patented Jan. 31, 1899.
C. FICKELSCHEER.
TENSION WHEEL.
(Application filed July 2, 1898.)
(No Model.) 2 Sheets—Sheet 1.
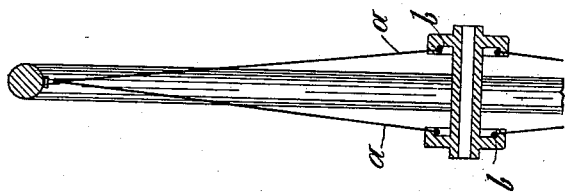
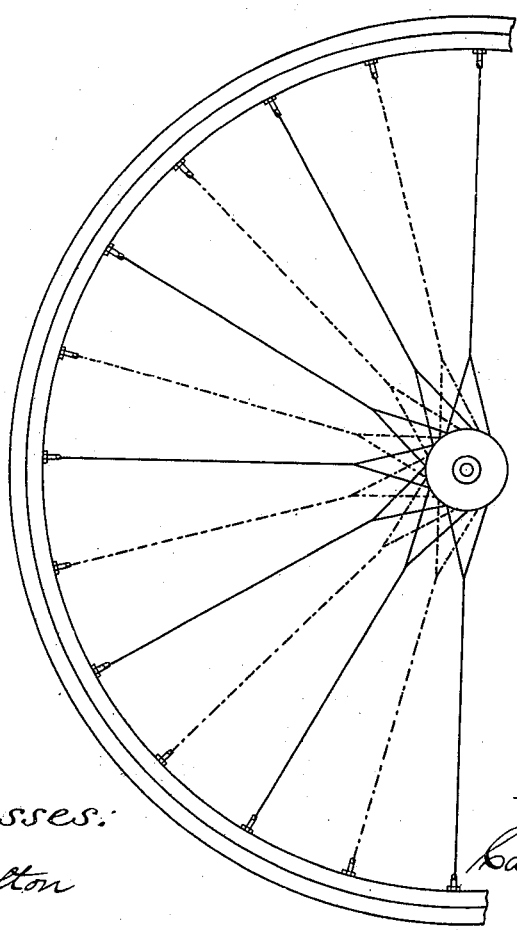

No. 618,456. Patented Jan. 31, 1899.
C. FICKELSCHEER.
TENSION WHEEL.
(Application filed July 2, 1898.)
(No Model.) 2 Sheets—Sheet 2.
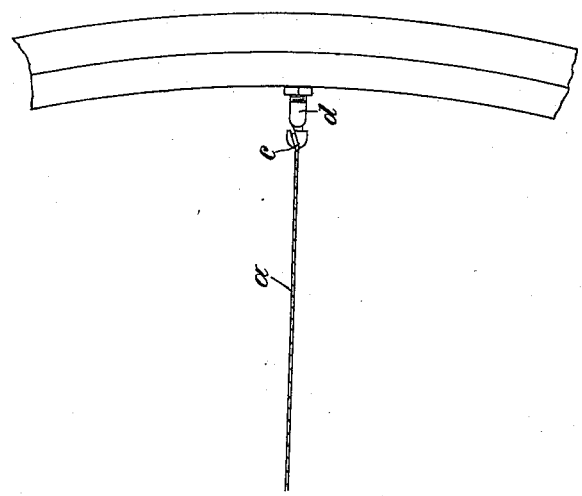
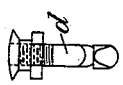
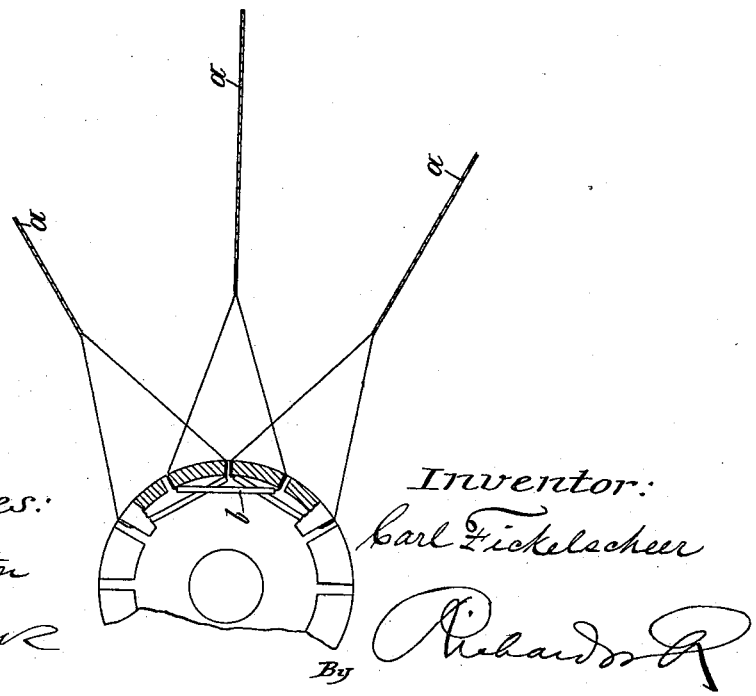
Witnesses: Inventor:
Carl Fickelscheer
By
his Attorneys.

UNITED STATES PATENT OFFICE.

CARL FICKELSCHEER, OF CASSEL, GERMANY.

TENSION-WHEEL.

SPECIFICATION forming part of Letters Patent No. 618,456, dated January 31, 1899.

Application filed July 2, 1898. Serial No. 685,031. (No model.)

*To all whom it may concern:*

Be it known that I, CARL FICKELSCHEER, a subject of the King of Prussia, Emperor of Germany, residing at Cassel, in the Kingdom of Prussia, Germany, have invented certain new and useful Improvements in Tension-Spokes for Wheels, and more particularly for Cycle-Wheels, (for which a patent has been applied for in Germany and which application is dated May 28, 1898,) of which the following is a specification.

The object of my invention is a new kind of tension-spokes for wheels in which the rim is connected to the spokes in the manner now generally adopted for cycle-wheels. The fundamental idea on which my new arrangement is based is to enable the person driving or riding the vehicle to make good again or repair at any time or place by means of reserve parts carried on the vehicle any damage or rupture happening to the spokes while running.

The accompanying drawings represent a wheel fitted with the new arrangement.

Figure 1 is an elevation of a wheel provided with the improved spokes. For the better comprehension of my invention I have shown the front spokes in full lines and those on the other side in dotted ones. Fig. 2 is a cross-section through the wheel. Fig. 3 shows the mode of connection of the spokes with the hub and rim on a larger scale. Fig. 4 shows a detail thereof in elevation.

In my new arrangement the spokes are for the purpose of subsequent tightening made of a double length of wire, which is twisted as shown in Fig. 3, the free ends of the single wires being led through notches provided in an annular projection of the hub and jointed therein by a tubular connecting-piece $b$, surrounding them. The other ends of the spokes are at the time the wire is twisted formed with eyes $c$, by means of which each spoke is attached to a nipple $d$. The latter may be fixed to the rim by simply riveting it over or the countersunk head passed through the rim and secured thereto by means of a nut bearing on the inner face. Fig. 4 shows an elevation of this arrangement before it is fitted to the rim. A small spanner allows of the tension being regulated. The further turning by means of this arrangement of the spokes hung to the hub and attached to the rim, results in their being tightened to the required extent.

To replace broken spokes at any place, it will suffice to carry on the vehicle a small roll of steel wire or a few ready-made spokes. In case no such reserve parts should be at hand the arrangement of the nipples and notches in the hub permits of a string or the like being used in cases of necessity, so that the wheel may still be used for a short time.

I claim—

1. In combination with the wheel having the rim and the hub with a notched rim, the spoke ends laid in said notches, and the tubular connections $b$ between said ends, substantially as described.

2. In combination, the wheel having the hub with a notched rim, the twisted spokes, the ends of which are laid in the notches, the tubular connections between the ends and the eyes and nipples for connecting the spokes with the rim, substantially as described.

In witness whereof I have hereunto signed my name in the presence of two subscribing witnesses.

CARL FICKELSCHEER. [L. S.]

Witnesses:
CARL KELLERMANN,
HEINRICH HERBST.